US008346716B2

(12) United States Patent
Watanabe

(10) Patent No.: US 8,346,716 B2
(45) Date of Patent: Jan. 1, 2013

(54) DOCUMENT MANAGEMENT SYSTEM

(75) Inventor: Ryutaro Watanabe, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 97 days.

(21) Appl. No.: 12/773,331

(22) Filed: May 4, 2010

(65) Prior Publication Data
US 2010/0293136 A1 Nov. 18, 2010

(30) Foreign Application Priority Data

May 12, 2009 (JP) .................. 2009-115788

(51) Int. Cl.
*G06F 17/30* (2006.01)
(52) U.S. Cl. ...................................... 707/608
(58) Field of Classification Search .................. 707/608
See application file for complete search history.

(56) References Cited

U.S. PATENT DOCUMENTS

| | | | |
|---|---|---|---|
| 2003/0004767 A1* | 1/2003 | Ohsaki | 705/7 |
| 2005/0262112 A1* | 11/2005 | Moore | 707/100 |
| 2009/0070162 A1* | 3/2009 | Leonelli et al. | 705/7 |
| 2009/0089737 A1* | 4/2009 | Komatsu | 717/102 |
| 2011/0153051 A1* | 6/2011 | Bachman et al. | 700/96 |

FOREIGN PATENT DOCUMENTS

JP 2000-123071 A 4/2000

* cited by examiner

*Primary Examiner* — Khanh Pham
(74) *Attorney, Agent, or Firm* — Canon USA Inc. IP Division

(57) ABSTRACT

The present invention can realize easy transition from a task managed by a To-Do list to a workflow. When an unprocessed task stored in the To-Do list database is converted by an instruction into the workflow in the client software, a document management system of the present invention extracts a workflow definition including an activity corresponding to an unprocessed task to be converted by the instruction and notifies a client software of the workflow definition. When the client software selects the workflow definition, server software creates an instance of the workflow corresponding to the selected workflow definition, and applies information about the task to be converted, to the activity corresponding to the task to be converted in the instance of the workflow.

10 Claims, 16 Drawing Sheets

FIG.3

TASK INFORMATION EXAMPLE IN FIRST EXEMPLARY EMBODIMENT

| TASK ID 301 | DESIRED DOCUMENT OPERATION 302 | CLIENT 303 | HANDLER 304 | TARGET DOCUMENT 305 | NOT YET/ DONE 306 |
|---|---|---|---|---|---|
| 0 | DISPLAY | TANAKA | SUZUKI | OVERTIME APPLICATION2.xls | DONE |
| 1 | EDIT | NOMURA | KATO | TRANSPORTATION EXPENSES APPLICATION5.doc | NOT YET |
| 2 | DISPLAY | SUZUKI | SATO | OVERTIME APPLICATION2.xls | NOT YET |
| 3 | DISPLAY | YAMAMOTO | SUZUKI | TRANSPORTATION EXPENSES APPLICATION6.doc | DONE |
| ... | ... | ... | ... | ... | ... |

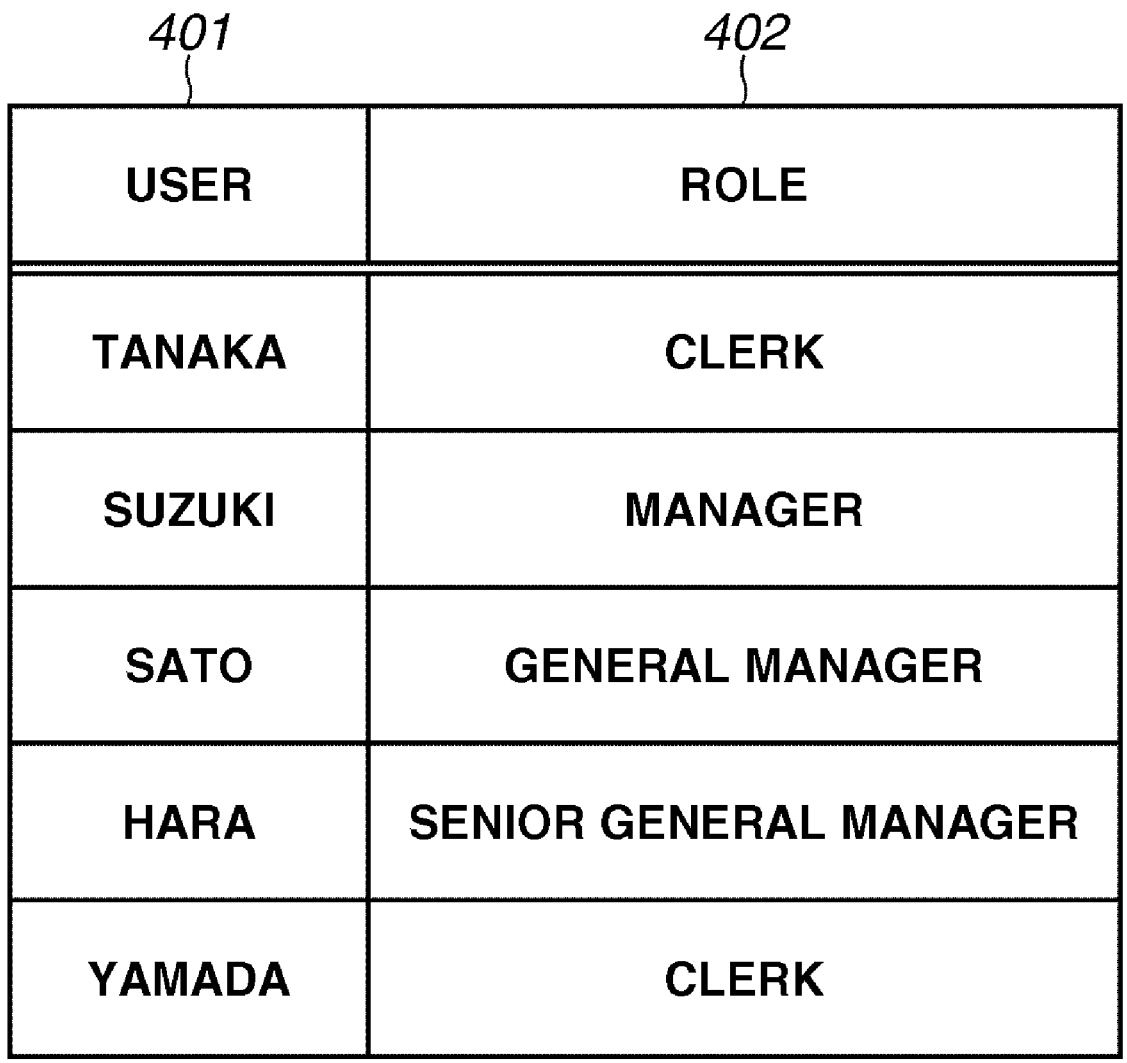

FIG.5

EXAMPLE OF WORKFLOW DEFINITION IN FIRST EXEMPLARY EMBODIMENT

| 501 | ACTIVITY 1 511 502 512 | | ACTIVITY 2 511 503 512 | | ACTIVITY 3 511 504 512 | | ACTIVITY 4 511 505 512 | |
|---|---|---|---|---|---|---|---|---|
| WF NAME | HANDLER | PROCESSING OPERATION | HANDLER | PROCESSING OPERATION | HANDLER | PROCESSING OPERATION | HANDLER | PROCESSING OPERATION |
| PURCHASE REQUEST | CLERK | APPLICATION | MANAGER | APPROVAL | MANAGEMENT DIVISION | PROCESSING | PURCHASE DIVISION | ORDER |
| TRANSPORTATION EXPENSES APPLICATION | CLERK | APPLICATION | MANAGER | APPROVAL | GENERAL MANAGER | APPROVAL | MANAGEMENT DIVISION | PROCESSING |
| OVERTIME APPLICATION | CLERK | APPLICATION | MANAGER | APPROVAL | GENERAL MANAGER | APPROVAL | SENIOR GENERAL MANAGER | APPROVAL |
| PATENT APPLICATION | CLERK | APPLICATION | MANAGER | EVALUATION | GENERAL MANAGER | EVALUATION | INTELLECTUAL PROPERTY DIVISION | PROCESSING |

FIG.6

EXAMPLE OF OPERATION CORRESPONDENCE MAP IN FIRST EXEMPLARY EMBODIMENT

| DOCUMENT OPERATION BY TASK (701) | PROCESSING OPERATION BY WORKFLOW (702) |
|---|---|
| EDIT | EVALUATION |
| EDIT | PROCESSING |
| DISPLAY | APPROVAL |
| PRINTING | CIRCULATION |

To-Do LIST CONVERSION INSTRUCTION
SCREEN IN FIRST EXEMPLARY EMBODIMENT

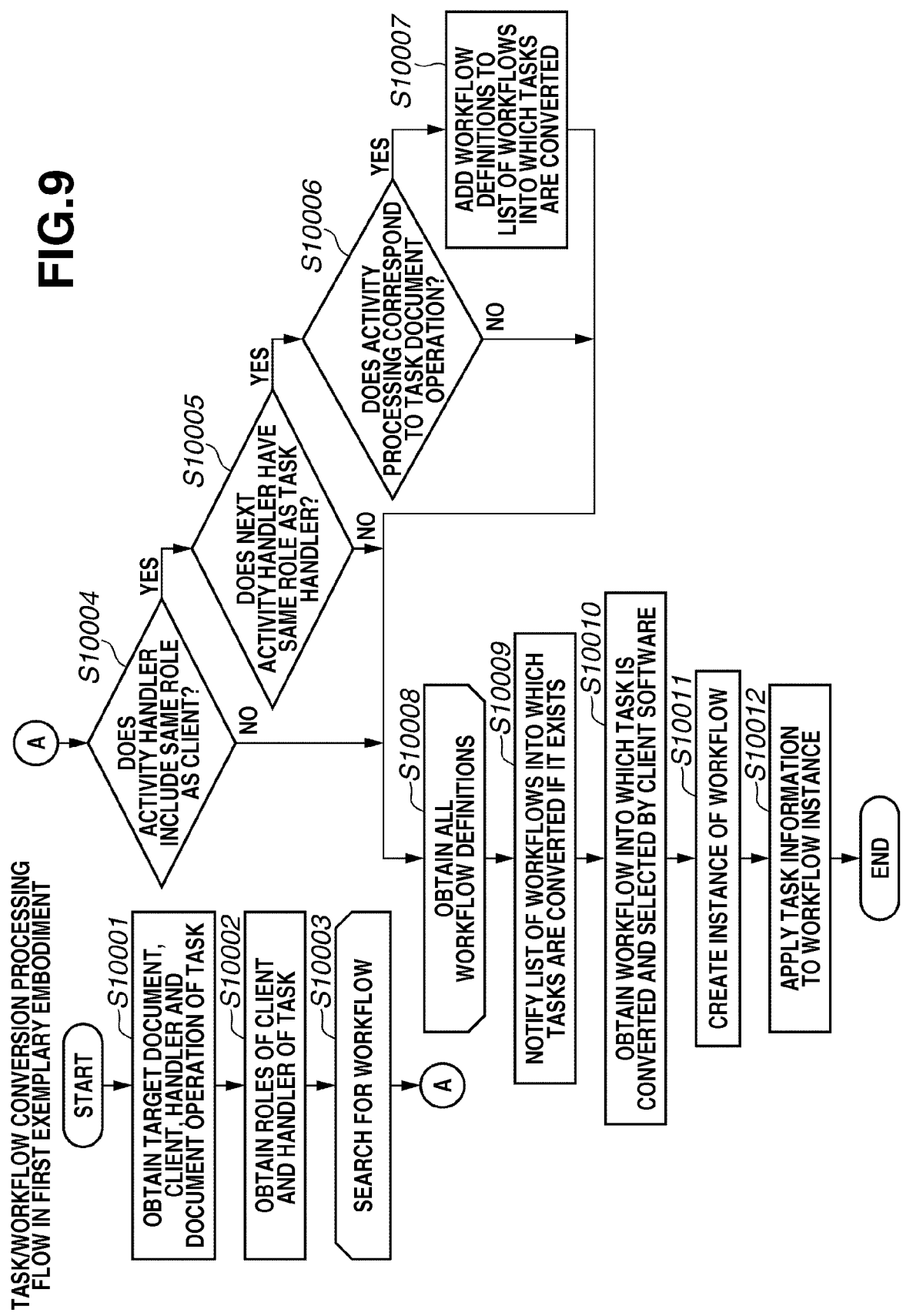

FIG.10

| WF NAME | ACTIVITY 1 | | ACTIVITY 2 | | ACTIVITY 3 | | ACTIVITY 4 | |
|---|---|---|---|---|---|---|---|---|
| | HANDLER | PROCESSING OPERATION | HANDLER | PROCESSING OPERATION | HANDLER | PROCESSING OPERATION | HANDLER | PROCESSING OPERATION |
| TRANSPORTATION EXPENSES APPLICATION | CLERK | APPLICATION | MANAGER | APPROVAL | GENERAL MANAGER | APPROVAL | MANAGEMENT DIVISION | PROCESSING |
| OVERTIME APPLICATION | CLERK | APPLICATION | MANAGER | APPROVAL | GENERAL MANAGER | APPROVAL | SENIOR GENERAL MANAGER | APPROVAL |
| PATENT APPLICATION | CLERK | APPLICATION | MANAGER | EVALUATION | GENERAL MANAGER | EVALUATION | INTELLECTUAL PROPERTY DIVISION | PROCESSING |

FIG.11

| WF NAME | ACTIVITY 1 | | ACTIVITY 2 | | ACTIVITY 3 | | ACTIVITY 4 | |
|---|---|---|---|---|---|---|---|---|
| | HANDLER | PROCESSING OPERATION | HANDLER | PROCESSING OPERATION | HANDLER | PROCESSING OPERATION | HANDLER | PROCESSING OPERATION |
| TRANSPORTATION EXPENSES APPLICATION | CLERK | APPLICATION | MANAGER | APPROVAL | GENERAL MANAGER | APPROVAL | MANAGEMENT DIVISION | PROCESSING |
| OVERTIME APPLICATION | CLERK | APPLICATION | MANAGER | APPROVAL | GENERAL MANAGER | APPROVAL | SENIOR GENERAL MANAGER | APPROVAL |

FIG.12

LIST OF WORKFLOWS INTO WHICH TASKS ARE CONVERTED IN FIRST EXEMPLARY EMBODIMENT

LIST OF CANDIDATES OF WORKFLOWS INTO WHICH TASKS ARE CONVERTED

| TRANSPORTATION EXPENSES APPLICATION |
|---|
| OVERTIME APPLICATION |

FIG.13

| 1301 | 1302 | 1303 | 1304 ACTIVITY 1 (DONE) | | 1305 ACTIVITY 2 (DONE) | | 1306 ACTIVITY 3 | | 1307 ACTIVITY 4 | |
|---|---|---|---|---|---|---|---|---|---|---|
| WFID | WF NAME | APPLICATION DOCUMENT | HANDLER | PROCESSING OPERATION | HANDLER | PROCESSING OPERATION | HANDLER | PROCESSING OPERATION | HANDLER | PROCESSING OPERATION |
| 0001 | OVERTIME APPLICATION | OVERTIME APPLICATION2.xls | CLERK | APPLICATION | SUZUKI | APPROVAL | SATO | APPROVAL | HARA | PROCESSING |

FIG.15

LIST OF CANDIDATES OF PROCESSED TO-DO
TASKS IN SECOND EXEMPLARY EMBODIMENT

SELECT PROCESSED TASK TO BE ADDED
AS PAST ACTIVITY OF WORKFLOW

LIST OF PROCESSED ACTIVITY CANDIDATES

| | |
|---|---|
| TANAKA → SUZUKI: DISPLAY OF OVERTIME APPLICATION 2.xls | 1201 |
| YAMAMOTO → SUZUKI: DISPLAY OF TRANSPORTATION EXPENSES APPLICATION6.xls | 1202 |

FIG.16

| WFID | WF NAME | APPLICATION DOCUMENT | ACTIVITY 1 (DONE) | | ACTIVITY 2 (DONE) | | ACTIVITY 3 | | ACTIVITY 4 | |
| --- | --- | --- | --- | --- | --- | --- | --- | --- | --- | --- |
| | | | HANDLER | PROCESSING OPERATION | HANDLER | PROCESSING OPERATION | HANDLER | PROCESSING OPERATION | HANDLER | PROCESSING OPERATION |
| 0001 | OVERTIME APPLICATION | OVERTIME APPLICATION2.xls | TANAKA | APPLICATION | SUZUKI | APPROVAL | SATO | APPROVAL | HARA | PROCESSING |

DOCUMENT MANAGEMENT SYSTEM

BACKGROUND OF THE INVENTION

1. Field of the Invention

The present invention relates to a control of a system for managing business operations by a To-do task.

2. Description of the Related Art

Since electronic documents have been playing a central role in business operations, a system that can manage the electronic documents in association with the business operations has become increasingly necessary. For that matter, a workflow system is known as general solution means. The workflow system previously defines a flow of business operations as a workflow, and documents necessary for each processing of the defined workflow are attached to perform the processing. The processing is referred to as an "activity".

For example, in an approval system, the workflow of "CREATION (GENERAL CLERK)→INVESTIGATION (MANAGER)→APPROVAL (GENERAL MANAGER)" is previously created. When a document of final decision is processed, an application document is attached at a state of "CREATION" of the flow, and approvals are given to the application document by a manager and a general manager when "INVESTIGATION" and "APPROVAL" are carried out in the flow.

However, since delicate settings such as user roles or flows need to be previously arranged in the workflow system, it takes too many hours to create the system when the system is used for small business operations. Further, since a workflow engine needs to be provided to control a complicated flow, the system increases in price and size.

Therefore, in small user circumstances as described in Japanese Patent Application Laid-Open No. 2000-123071, methods for readily associating the electronic document with the business operations are in many cases adopted by using a document management system and a To-do list function thereof.

In such a system, each user can provide a document with a flag such as a To-Do flag in the document management system, and can describe job contents on the document. With these arrangements, the association between the document and the business operations to be performed on the document can be realized.

For example, Japanese Patent Application Laid-Open No. 2000-123071 allows another user to add an item to the To-do list to realize a job flow with the To-Do list.

SUMMARY OF THE INVENTION

The present invention is directed to a system that can make it easy for a user to replace a job flow managed by a To-do list with a workflow.

According to an aspect of the present invention, in a document management system that includes a client apparatus and a server apparatus and individually manages a document operation job by an independent task, the client apparatus includes an instruction unit configured to give an instruction to convert an unprocessed task managed by the server apparatus into a workflow, and the server apparatus includes a task database configured to store the task, a workflow management database configured to store a definition of a workflow including a plurality of activities to be sequentially processed, an extraction unit configured to extract a workflow definition including an activity corresponding to the unprocessed task to be converted into the workflow by an instruction of the client apparatus, from the workflow management database, a creation unit configured to create an instance of the workflow corresponding to the workflow definition extracted by the extraction unit, and an application unit configured to apply information of the task to be converted by an instruction, to the activity corresponding to the task to be converted, in an instance of the workflow created by the creation unit.

According to another aspect of the present invention, a server apparatus used by a document management system that includes a client apparatus and a server apparatus and individually manages a document operation job by an independent task, includes a task database configured to store the task, a workflow management database configured to store a definition of a workflow including a plurality of activities to be sequentially processed, an extraction unit configured to extract a workflow definition including an activity corresponding to the unprocessed task to be converted into the workflow by an instruction of the client apparatus, from the workflow management database, a creation unit configured to create an instance of the workflow corresponding to the workflow definition extracted by the extraction unit, and an application unit configured to apply information of the task to be converted by the instruction, to the activity corresponding to the task to be converted, in the instance of the workflow created by the creation unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 3 illustrates one example of a To-do list database.

FIG. 4 illustrates one example of a role management database.

FIG. 5 illustrates one example of workflow definition information stored in a workflow management database.

FIG. 6 illustrates one example of an operation correspondence map.

FIG. 9 is a flowchart illustrating one example of processing for converting a task into a workflow.

FIG. 10 illustrates one example of workflow definitions extracted in step S10005 illustrated in FIG. 9.

FIG. 11 illustrates one example of workflow definitions extracted in step S10006 illustrated in FIG. 9.

FIG. 12 illustrates one example of a workflow candidate list, which is suggested to a user, into which tasks are converted.

FIG. 13 illustrates one example of an instance of a workflow converted from a task.

FIG. 15 illustrates a list, of candidates of processed activities, which is suggested to the user.

FIG. 16 illustrates one example of the instance of the workflow to which the processed task is applied.

DESCRIPTION OF THE EMBODIMENTS

Various exemplary embodiments, features, and aspects of the invention will be described in detail below with reference to the drawings.

Even when a job flow is realized using a conventional To-do list, if a system scale expands, for example, due to an increase in users, or a unification of the system, the job flow using the To-Do list needs to be changed to a workflow system.

However, the job flow using the To-Do list does not associate a task currently being processed with a task processed prior to the current task. For example, each To-do task in the To-Do list includes information about a client and a handler of a task, but not information about a client of a previously processed task. Further, a task to be processed after a currently processed task is not yet created.

While the task flow using the To-Do list individually manages a target person, a workflow manages the target person using his post, which is referred to as a role. While a requested operation that is described in the To-do list is performed on a basis of an operation of a document management system, an operation processed in the workflow has an operation name unique to the workflow and is a different kind of operation from that in the To-do list. Because of such differences, the job flow using the To-Do list cannot be simply replaced with the workflow.

Therefore, the user has to create each new workflow corresponding to the To-Do list while checking the contents of the To-Do list, thereby generating complicated works. Exemplary embodiments of the present invention described below solve the problems described above.

The present invention provides a system that makes it easy for the user to replace the job flow managed by the To-Do list with the workflow. With reference to figures, the exemplary embodiments for implementing the present invention will be described.

Figure 1:
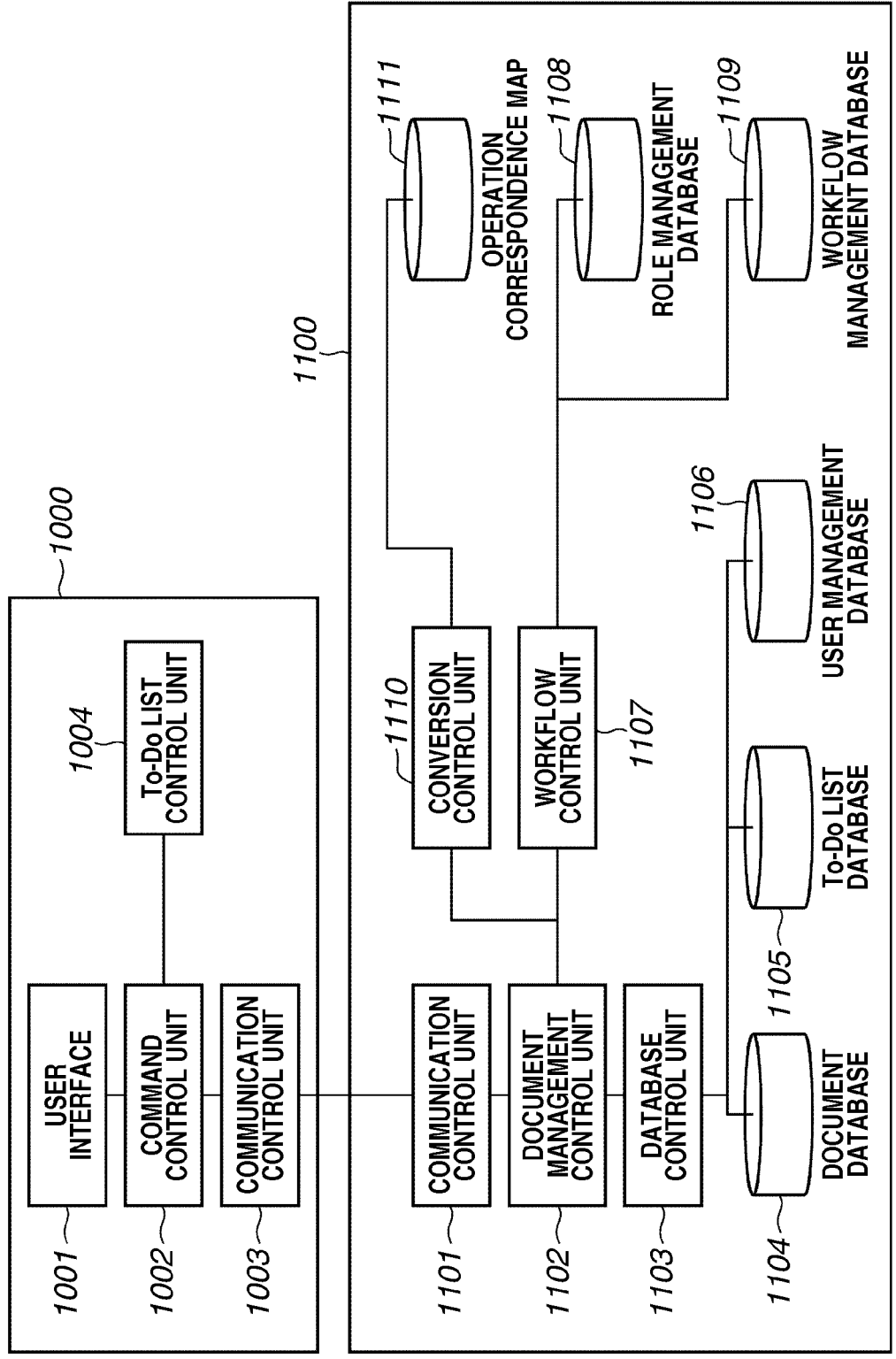
FIG. 1 is a block diagram illustrating a configuration of a document management system that illustrates a first exemplary embodiment of the present invention.
Figure 2:
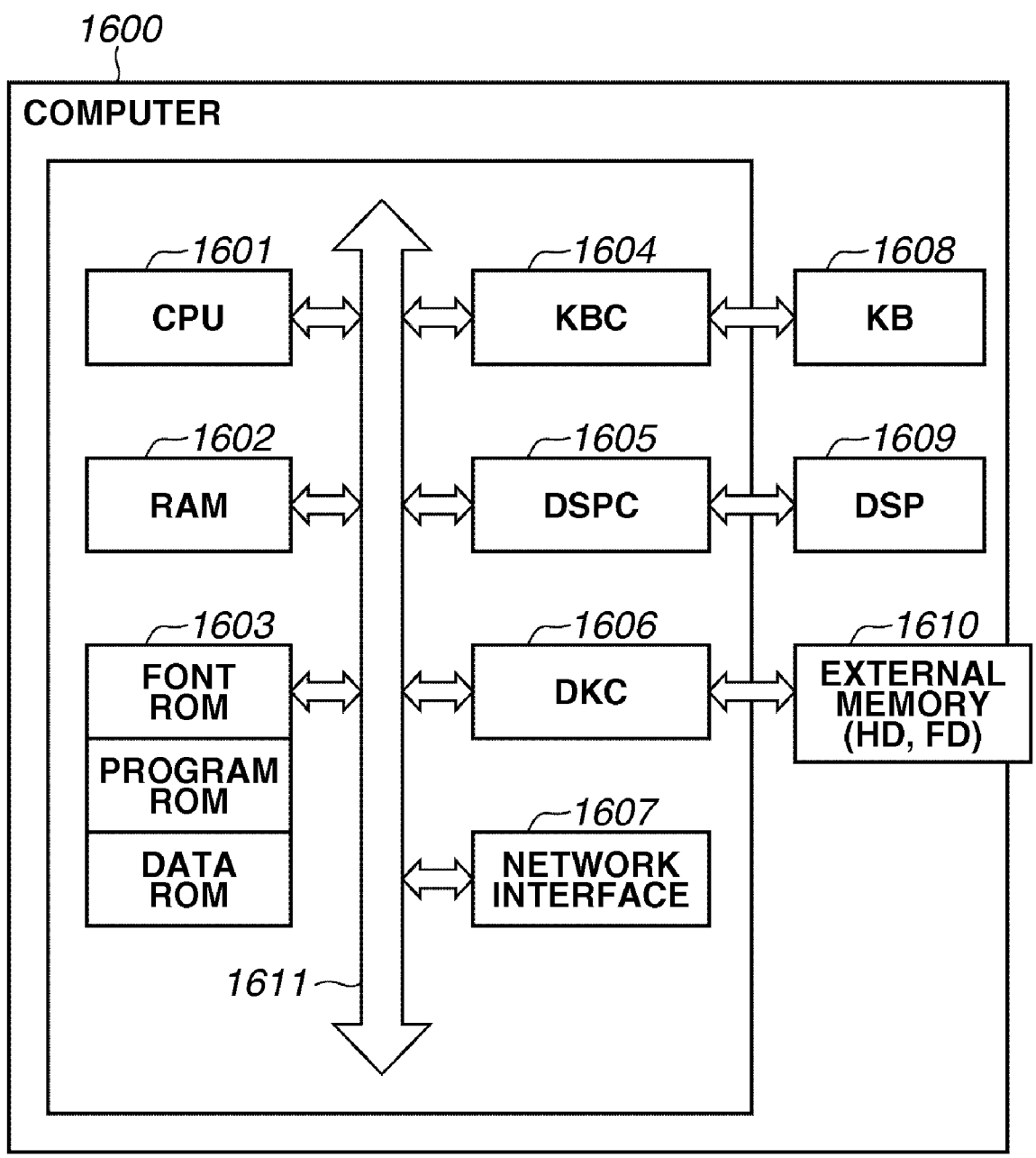
FIG. 2 illustrates a configuration of a general information processing apparatus.

FIG. 1 is a block diagram illustrating a configuration of a document management system (information processing system) illustrating a first exemplary embodiment of the present invention. FIG. 1 illustrates client software 1000 of the document management system, and server software 1100 of the document management system. The client software 1000 is software running on an operating system (OS) of a client apparatus that includes a computer as illustrated in FIG. 2 described below. The server software 1100 is software, which is operated on the OS of a server apparatus including the computer as illustrated in FIG. 2 described below.

The client software 1000 includes a user interface 1001. The client software 1000 receives a user operation via the user interface 1001 and transmits the user operation to a command control unit 1002. The command control unit 1002 performs a control using a communication control unit 1003 and a To-Do list control unit 1004 according to the user operation received from the user interface 1001, and returns operation results to the user interface 1001. The communication control unit 1003 communicates with the server software 1100 according to an instruction from the command control unit 1002. The To-Do list control unit 1004 controls the To-Do list according to the instruction from the command control unit 1002.

The server software 1100 includes a communication control unit 1101, and communicates with the client software 1000 according to the instruction from the document management control unit 1102. The document management control unit 1102 receives an operation request from the client software 1000 via the communication control unit 1101. According to the operation request, the communication control unit 1101 performs the control using a database control unit 1103, a workflow control unit 1107, and a conversion control unit 1110, and returns the operation results to the client software 1000 via the communication control unit 1101.

The database control unit 1103 controls a document database 1104, a To-Do list database 1105, and a user management database 1106 according to the instruction from the document management control unit 1102. The document database 1104 stores document information. The To-Do list database 1105 is a task database that stores To-Do list information (To-Do task) as illustrated in FIG. 3 described below. The user management database 1106 stores user information.

A workflow control unit 1107 controls a role management database 1108 and a workflow management database 1109 according to the instruction from the document management control unit 1102. The role management database 1108 stores role information illustrated in FIG. 4 and used for the workflow. The workflow management database 1109 stores workflow information, which is workflow definition information as illustrated in FIG. 5 described below and the instance of the workflow as illustrated in FIG. 13 described below.

A conversion control unit 1110 controls an operation correspondence map 1111 according to the instruction from the document management control unit 1102. The operation correspondence map 1111 stores information about correspondence between processing operations on the To-Do task and activities by the workflow as illustrated in FIG. 6. A configuration of a general information processing apparatus applicable to the client apparatus and the server apparatus of the document management system illustrated in FIG. 1 will be described below.

FIG. 2 illustrates a configuration of a general information processing apparatus (computer 1600) applicable to the client apparatus and the server apparatus of the document management system illustrated in FIG. 1. In a computer 1600, a central processing unit (CPU) 1601 controls each device connected to a system bus 1611 based on a program stored in a program reading only memory (ROM) of the ROM 1603 or an external memory 1610, and entirely controls the whole computer 1600.

A font ROM of the ROM 1603 stores font data used when the present exemplary embodiment is processed. A data ROM of the ROM 1603 stores various kinds of data used when the exemplary embodiment is processed. A random access memory (RAM) 1602 functions as a main memory and a working area of the CPU 1601. A keyboard controller (KBC) 1604 controls inputs from a keyboard (KB) 1608 and a pointing device such as a mouse (not illustrated). A display controller (DSPC) 1605 controls a view of a display (DSP) 1609.

The display may be a cathode ray tube (CRT) or other type of display apparatus such as a liquid crystal display (LCD). A network interface 1607 controls a communication between the document management system and an external apparatus via a network (not illustrated). A disk controller (DKC) 1606 controls access to an external memory such as a hard disk (HD), a flexible disk (FD), and a compact disk-ROM (CD-ROM) (not illustrated). The external memory 1610 stores an operating system program (hereafter, referred to as an "OS") and a program for realizing the client software 1000 and the server software 1100 illustrated in FIG. 1.

The CPU 1601 loads a program stored in the external memory 1610 into the RAM 1602 and executes the program to realize each function of the client software 1000 and the server software 1100 illustrated in FIG. 1. The CPU 1601 opens various kinds of previously registered windows and executes various kinds of data processing based on a command instructed via a mouse cursor (not illustrated) on the display 1609.

Information stored in each database illustrated in FIG. 1 will be described below.

FIG. 3 illustrates one example of To-Do list information stored in the To-Do list database 1105. As illustrated in FIG. 3, each To-Do task in the To-Do list information includes information such as a task ID 301, a document operation 302, a client 303, a handler 304, a target document 305, and information of not yet/done 306.

The task ID 301 uniquely discriminates a task. The document operation 302 refers to an operation that is performed on a document and requested by the task. The client 303 indicates a name of a user requesting the task. The handler 304 indicates a name of a user processing the task. The target document 305 indicates a name of the document in the document database 1104 operated by the task. The information of not yet/done 306 indicates whether or not the task has been processed, i.e., done or not yet. Each To-Do task stored in the To-Do list database 1105 is individually processed. By processing such To-Do tasks, the document management control unit 1102 manages the operations of the documents stored in the document database 1104.

FIG. 4 illustrates one example of role information stored in the role management database 1108. As illustrated in FIG. 4, the role information includes a user 401 indicating a name of a user to become a handler of the workflow and a role 402 indicating a role (post) of the user. According to the present exemplary embodiment, the user to become the handler of the workflow can also be the user who may become the client or the handler of the task described above.

FIG. 5 illustrates one example of workflow definition information stored in the workflow management database 1109. As illustrated in FIG. 5, the workflow definition includes a name of a workflow (WF name) 501 for uniquely discriminating the workflow definition and a plurality of activities 502, 503, 504, and 505 (activities 1, 2, 3, 4, and 5 in the example of FIG. 5 (502, 503, 504, and 505)). Each activity includes a handler 511 indicating the role of the handler in the activity and a processing operation 512 indicating a processing operation therein. Each activity is sequentially processed in order from a smallest number provided to the activity.

In the example illustrated in FIG. 5, activities 1, 2, 3, and 4 are sequentially processed in order. As described above, the workflow definition is made by the ordered activities including information about the roles of the handlers and the processing operations processed thereby. In the example illustrated in FIG. 5, the workflow management database 1109 stores "PURCHASE REQUEST", "TRANSPORTATION EXPENSES APPLICATION", "OVERTIME APPLICATION", and "PATENT APPLICATION", as examples of the workflow definitions including four activities.

FIG. 6 illustrates one example of information about correspondence between the processing operation by the task stored in the operation correspondence map 1111 and the activity by the workflow. As illustrated in FIG. 6, information about correspondence between the processing operation by the task and the activity by the workflow includes a document operation 701 by the task and a processing operation 702 by the workflow. The document operation 701 by the task indicates the processing operation corresponding to the document operation 302 by the To-Do task. Further, the processing operation 702 indicates the processing operation corresponding to the processing operation 512 by the workflow definition.

In the example illustrated in FIG. 6, the processing of "EVALUATION" and "PROCESS" by the workflow correspond to the document operation "EDIT" by the task. The processing of "APPROVAL" and "CIRCULATION" by the workflow corresponds to the document operations of "DISPLAY" and "PRINT" by the task respectively.

Figure 7A:
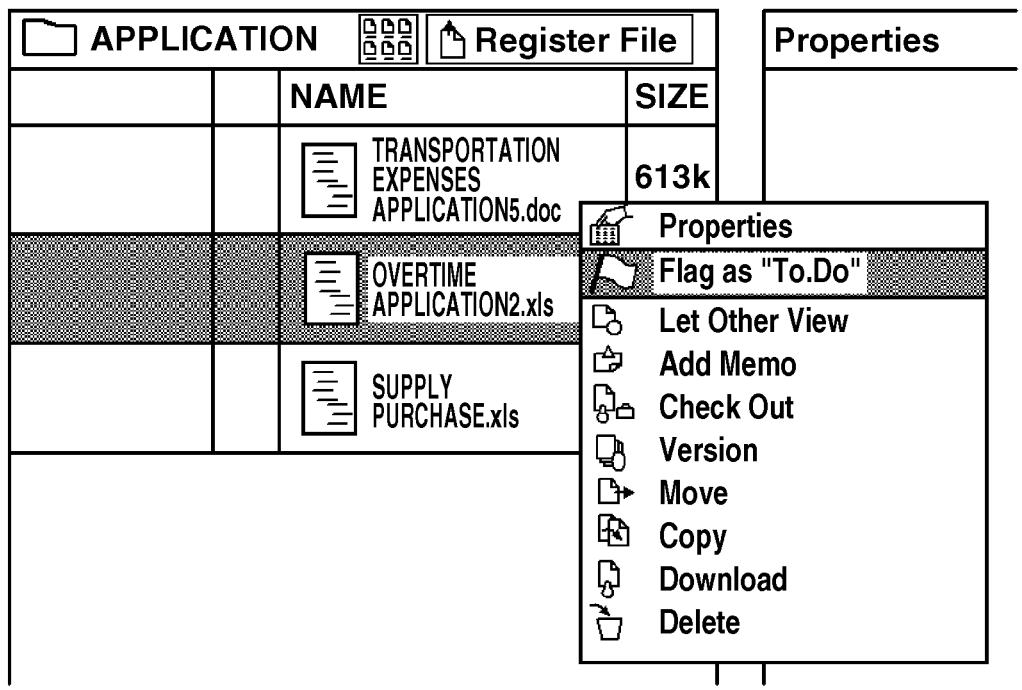
FIGS. 7A and 7B illustrate a procedure for creating the To-Do task.
Figure 7B:
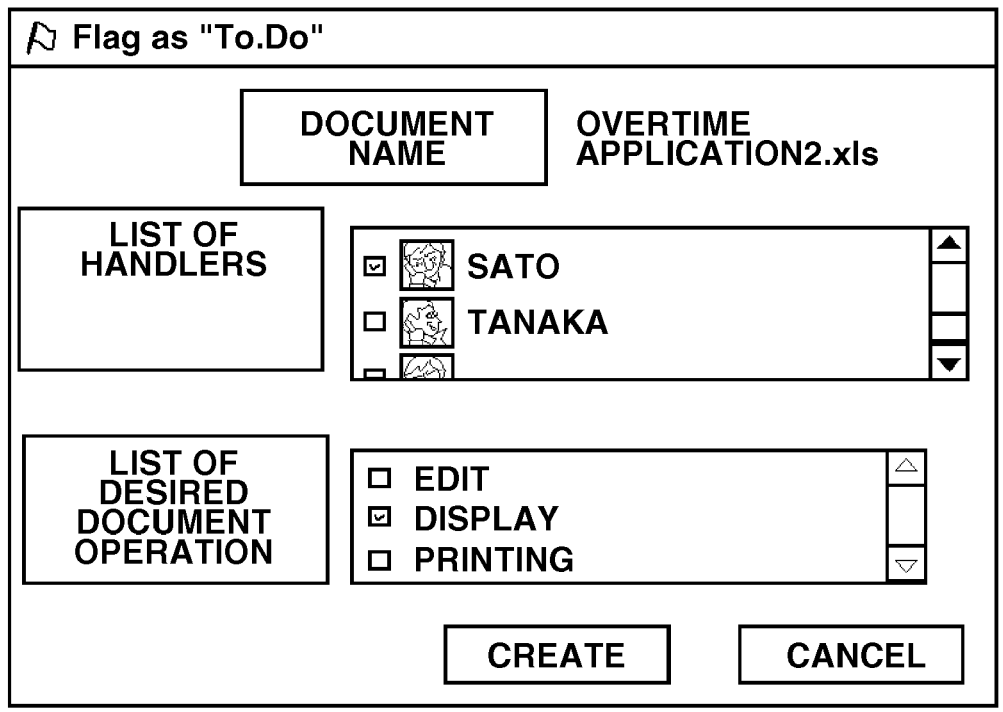

A procedure for creating the To-Do task according to the present exemplary embodiment will be described below. FIGS. 7A and 7B illustrate a procedure for creating the To-Do task. As illustrated in FIG. 7A, the user selects the document managed by the document database 1104 via the client software 1000, and gives instructions about the document to create the To-Do task. The client software 1000 that has received a user's request via the user interface 1001 transmits the request to the server software 1100 via the communication control unit 1003.

The server software 1100 that has received the request obtains a list of the document operations from the To-Do list database 1105 and a list of the users from the user management database 1106, and returns obtained results to the client software 1000. The client software 1000 that has received the lists, displays for the user the To-Do task creation screen illustrated in FIG. 7B that displays the list of the users as the "LIST OF THE HANDLERS" and the list of the document operations as the "LIST OF THE DESIRED DOCUMENT OPERATIONS". The list of the "DESIRED DOCUMENT OPERATION" displays, for example, "EDIT", "DISPLAY", and "PRINT".

For example, a user "SUZUKI" creates a task of a document of "OVERTIME APPLICATION2.xls". The user "SUZUKI" selects "SATO" in the list of "HANDLER" in the corresponding document, and selects "DISPLAY" in the "LIST OF DESIRED DOCUMENT OPERATIONS". The user "SUZUKI" presses a "CREATE" button to give an instruction and notifies that all inputs are completed. The client software 1000 receives the notification via the user interface 1001. The client software 1000 that has received the notification creates the To-Do task by the To-Do list control unit 1004. The To-Do list control unit 1004 obtains "CLIENT" indicating the current operation user, "TARGET DOCUMENT", "HANDLER", and "DESIRED OPERATION".

The To-Do list control unit 1004 then combines "CLIENT", "TARGET DOCUMENT", "HANDLER", and "DESIRED OPERATION" to create the To-Do task. The client software 1000 transmits the created To-Do task to the server software 1100 via the communication control unit 1003. The server software 1100 provides the received To-Do task with the task ID 301, and stores "NOT YET" for the information not yet/done 306 in the To-Do list database 1105. With this arrangement, the task indicated by the task ID "2" illustrated in FIG. 3 is stored in the To-Do list database 1105.

Hereafter, when the user "SATO" operates the document or obtains the To-Do list from the client software 1000, such operations are notified to the server software 1100, which creates the To-Do list having the handler "SATO". This To-Do list is notified from the server software 1100 to the client software 1000, and the To-Do list having the handler "SATO" is displayed on the user interface 1001.

The user "SATO" can check and process the task (i.e., the document operation for the document of "OVERTIME APPLICATION 2.xls") included in the To-Do list. Further, the user "SATO" can create the To-Do task for the document of the "OVERTIME APPLICATION 2.xls" as necessary and circulate the job to other users.

According to the present exemplary embodiment, as illustrated in FIG. 7B, the user can select the "HANDLER" and the "DESIRED OPERATION" from the lists on the To-Do task creation screen. Such a selection and a To-Do task can readily realize the job flow (simple workflow) for circulating the job from a person to a person. As a result, a necessary job can be efficiently circulated to other users.

A flow of processing for converting the To-Do list into the workflow according to the present exemplary embodiment will be described below. Firstly, the user gives an instruction to obtain unprocessed tasks via the user interface 1001. The client software 1000 requests the server software 1100 to obtain a list of the unprocessed tasks stored in the To-Do list database 1105 and to display the list on the user interface 1001, which serves as a task list screen illustrated in FIG. 8. In the task obtained here, the user may be a user operating as described above or all users, as the handler 304. Alternatively, only the user having a management authority may be able to obtain the task for all users.

Figure 8:
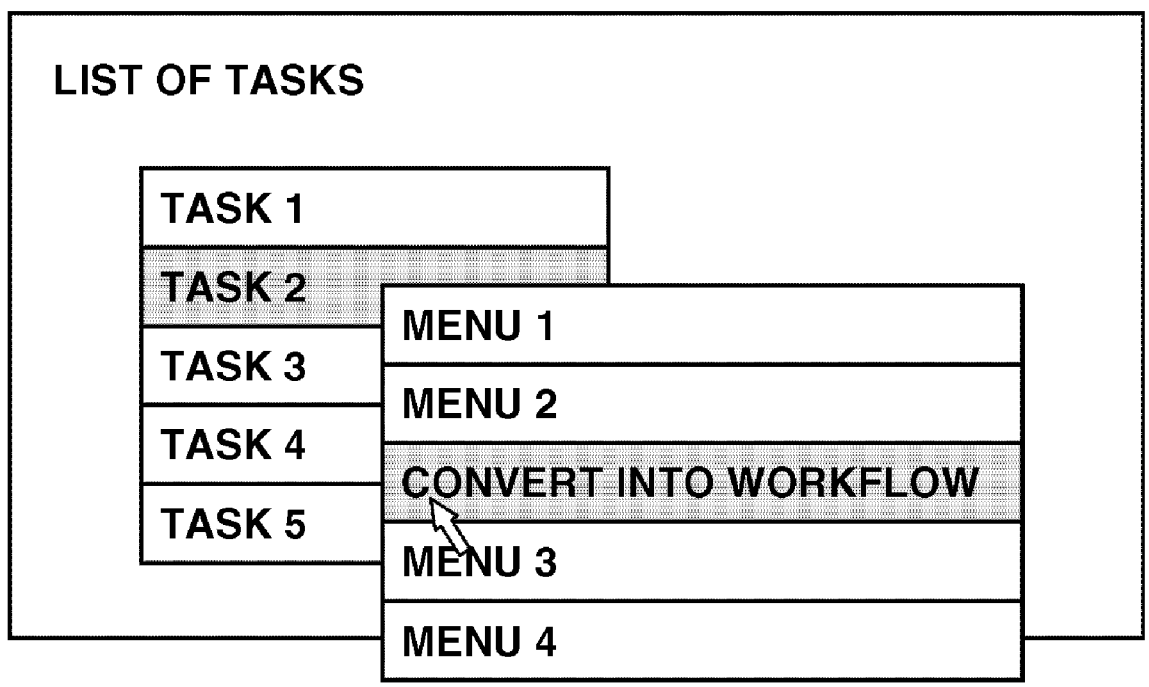
FIG. 8 illustrates one example of a task list screen.

FIG. 8 illustrates one example of a task list screen displayed on the user interface 1001. The user selects the task via the user interface 1001 as illustrated in FIG. 8 and gives an instruction to convert the task into the workflow. The user interface 1001 notifies the command control unit 1002 of the user operation.

The command control unit 1002 notifies the server software 1100 of the identifier (task ID) of the task to be converted into the above-described workflow and a list of the workflows into which the tasks are converted via the communication control unit 1003.

The document management control unit 1102 in the server software 1100 receives via the communication control unit 1101 the identifier (task ID) of the task to be converted into the above-described workflow and the list of the workflows into which the tasks are converted. Subsequently, the document management control unit 1102 executes processing for converting the task into the workflow. With reference to FIG. 9, the processing will be described in detail.

FIG. 9 is a flowchart illustrating one example of processing for converting the task into the workflow. The processing of the flowchart can be executed by the server software 1100. In other words, the processing of the flowchart can be realized by the CPU of the server apparatus that loads a program stored in an external memory into the RAM and executes the program.

In step S10001, the document management control unit 1102 obtains information about the above-described task from the To-Do list database 1105 via the database control unit 1103 based on the task ID of the task that is to be converted into the above-described workflow. More specifically, the document management control unit 1102 obtains the target document 305, the client 303, the handler 304, and the document operation 302 of the task. For example, when the task ID of the task is "2", "OVERTIME APPLICATION2.xls" as the target document 305, "SUZUKI" as the client 303, "SATO" as the handler 304, and "EDIT" as the document operation 302 are obtained.

In step S10002, the document management control unit 1102 obtains from the role management database 1108 via the workflow control unit 1107 the roles of the client and the handler obtained in step S10001. In the example described above, "MANAGER" as the role of the client "SUZUKI" and "GENERAL MANAGER" as the role of the handler "SATO" are obtained.

In step S10003, the document management control unit 1102 obtains a workflow definition one by one from the workflow management database 1109 via the workflow control unit 1107. The document management control unit 1102 performs a control so that the processing in steps S10004, S10005, S10006, and S10007 can be performed on each workflow definition every time one workflow definition is obtained. In step S10003, if the workflow definition can be obtained, the processing proceeds to step S10004. When the workflow definition cannot be obtained, the processing proceeds to step S10008.

In step S10004, the document management control unit 1102 determines whether activities by the workflow definition obtained in step S10003 involve an activity of a handler having the same role as the client of the task obtained in step S10002. When it is determined that the activity involving the handler having the same role as the client of the task is not included (NO in step S10004), the document management control unit 1102 returns the processing to step S10003 and controls the processing to be performed on the following workflow definition.

On the other hand, when it is determined that the activity involving the handler having the same role as the client of the task is included (YES in step S10004), the document management control unit 1102 allows the processing to proceed to step S10005. For example, when the workflow definitions illustrated in FIG. 5 are included in the workflow management database 1109, since all the workflow definitions include the role of "MANAGER", which is the role of the client "SUZUKI", all workflow definitions are extracted. Subsequently, the processing proceeds to step S10005.

In step S10005, the document management control unit 1102 determines whether the handler of the following activity that is determined to include the same role as the client of the task has the same role as the handler of the task obtained in the step S10002. When it is determined that the handler of the following activity does not have the same role as the handler of the task (NO in step S10005), the communication control unit 1101 returns the processing to step S10003 and controls the processing to be performed on the following workflow definition.

On the other hand, if it is determined that the handler of the following activity has the same role as the handler of the task (YES in step S10005), the document management control unit 1102 allows the processing to proceed to step S10006. For example, from among the workflow definitions illustrated in FIG. 5, only three definitions, "TRANSPORTATION EXPENSES APPLICATION", "OVERTIME APPLICATION", and "PATENT APPLICATION" that include the role of "GENERAL MANAGER" as the handler next to the activity of the role of "MANAGER" are extracted, and the processing proceeds to step S10006. These workflow definitions are illustrated in FIG. 10. FIG. 10 illustrates one example of the workflow definitions that are determined to include the handler of the following activity involving the same role as the handler of the task in step S10005 illustrated in FIG. 9.

In step S10006, the document management control unit 1102 obtains an operation correspondence map from the operation correspondence map 1111 via the conversion control unit 1110. The document management control unit 1102 obtains the processing operation 702 in the workflow corresponding to the document operation 302 demanded by the task obtained in step S10001. Further, the document management control unit 1102 determines whether the processing operation 512 of the activity determined to include the handler having the same role as the handler of the task in step S10005 is the same operation as the processing operation 702 of the workflow obtained from the operation correspondence map 1111. When it is determined that the processing operation 512 of the activity is not the same operation as the processing operation 702 of the workflow (NO in step S10006), the document management control unit 1102 returns the processing to step S10003 and controls the processing to be performed on the following workflow definition.

On the other hand, if it is determined that the processing operation 512 of the activity is the same operation as the processing operation 702 of the workflow (YES in step S10006), the document management control unit 1102 allows the processing to proceed to step S10007. For example, from the operation correspondence map illustrated in FIG. 6, "APPROVAL" is obtained as the processing operation of the workflow corresponding to the document operation of "DISPLAY" demanded by the task.

From among the workflow definitions that are illustrated in FIG. 10 and determined to be "YES" in step S10005, only two definitions, "TRANSPORTATION EXPENSES APPLICATION" and "OVERTIME APPLICATION", are extracted that include the processing operation of "APPROVAL" of the activity with respect to the role of the "GENERAL MANAGER", and the processing proceeds to step S10007. FIG. 11 illustrates these workflow definitions. FIG. 11 illustrates the example of the workflow definitions that are determined to include the processing operation 512 of the activity having the same operation as the processing operation 702 of the workflow in step S10006 in FIG. 9.

In step S10007, the document management control unit 1102 adds the WF name 501 of the workflow definition obtained in step S10003 to a list of workflows into which the tasks are converted. When all the processing performed in steps S100003, S100004, S100005, S100006, and S100007 are completed, in step S10008, the document management control unit 1102 finishes extraction of the list of workflows, and allows the processing to proceed to step S10009. In the example described above, at this point, the WF name of the workflow definition illustrated in FIG. 11 is extracted as the list of the workflows into which the tasks are converted.

In step S10009, the document management control unit 1102 notifies the client software 1000 of the extracted list of the workflows into which the tasks are converted via the communication control unit 1101, and waits for a reply from the client software 1000. When the list of the conversion destination workflows does not exist, the document management control unit 1102 notifies the client software 1000 of no existence of the list via the communication control unit 1101 (not illustrated), and allows the processing of the flowchart to end.

The client software 1000 receives the list of the conversion destination workflows via the communication control unit 1003. The command control unit 1002 that has received the list of the conversion destination workflows shows the received list to the user via the user interface 1001 as a list of the candidate workflows as illustrated in FIG. 12, and prompts the user to make a selection.

FIG. 12 illustrates one example of a list, which is suggested to a user, of candidates of the workflows into which tasks are converted. When the user selects the conversion destination workflow from the list of the candidate workflows illustrated in FIG. 12, the user interface 1001 notifies the command control unit 1002 of the WF name of the selected workflow.

The command control unit 1002 that has received from the user interface 1001 the WF name of the conversion destination workflow and selected by the user notifies the server software 1100 of the WF name of the selected workflow via the communication control unit 1003.

In step S10010, in the server software 1100, the document management control unit 1102 obtains the WF name of the conversion destination workflow, notified by the client software 1000 via the communication control unit 1101. The document management control unit 1102 notifies the workflow control unit 1107 of the obtained WF name of the conversion destination workflow, the task information obtained in step S10001, and the activity to which the task information is applied. Subsequently, the document management control unit 1102 gives an instruction to convert the task into the workflow.

The activity to which the task information is applied refers to the activity used as a condition when the list of the workflows is extracted, and determined to include the handler having the same role as the client of the task in step S10004. In step S10011, the workflow control unit 1107 that has received this instruction creates an instance of the workflow corresponding to the workflow definition having the specified WF name.

In step S10012, the workflow control unit 1107 adopts the client 303 of the specified task as a handler 1311 illustrated in FIG. 13 of the specified activity in the instance of the created workflow. Further, the workflow control unit 1107 adopts the handler 304 of the specified task as a handler 1311 illustrated in FIG. 13 of the following activity of the specified activity in the created instance of the workflow. Furthermore, the workflow control unit 1107 adopts the target document 305 of the specified task as an application document 1303 illustrated in FIG. 13 in the created instance of the workflow.

For example, when "OVERTIME APPLICATION" is selected as the conversion destination workflow, a client "SUZUKI" of the task having the task ID of "2" is applied to the handler 1311 of the activity "2" in the instance of the workflow. Further, the handler "SATO" of the task having the task ID of "2" is applied to the handler 1311 of the activity "3" in the instance of the workflow. Furthermore, the target document "OVERTIME APPLICATION2.xls" of the task having the task ID of "2" is applied to the application document 1303 illustrated in FIG. 13 in the instance of the workflow. FIG. 13 illustrates results of the applications described above.

FIG. 13 illustrates one example of the instance of the conversion destination workflow. The example illustrated in FIG. 13 is converted from the task having the task ID of "2" and corresponds to the instance of the workflow. A workflow ID (WF ID) 1301 is provided by the workflow control unit 1107 when the instance of the workflow is created to uniquely discriminate the instance of the workflow.

The workflow control unit 1107 stores in the workflow management database 1109 the instance of the workflow to which the task information is applied. According to the present exemplary embodiment, when the user selects the task from the To-Do list and gives an instruction to convert the task, the narrowed down workflows into which the task is to be converted are displayed. Subsequently, the user only selects anyone flow from the workflows to convert the task into the workflow.

Further, according to the present exemplary embodiment, even when only one task related to the same job flow exists in the To-Do list, the task can be referred to the workflow definitions so that the workflow including a plurality of tasks can be created. As described above, even when all of the tasks forming the job flow do not exist, only a part of tasks can create the workflow.

When only one workflow definition is extracted as the list of the conversion destination workflows (not illustrated in FIG. 9), the document management control unit 1102 may allow the processing to directly proceed to step S10011 without notifying of the list of the conversion destination workflows. In this case, in step S10011, the instance of the workflow corresponding to the only one extracted workflow definition is created.

In the first exemplary embodiment, the created instance of the workflow includes the information about the following tasks processed after the conversion source task, but not the information about the tasks processed before the conversion source task. In the present exemplary embodiment, as the processed activity in the created instance of the workflow, the information about the task processed before the conversion source task is applied.

Firstly, the processed task is extracted that includes the handler 1311 of the activity to which the client of the conversion source task is applied having the same person as the handler 304, and the processing operation 1312 having the same operation as the demanded document operation 302. Further, the processed task includes the handler 1311 of a primarily preceding activity having the same person as the client 303. The extracted task information is applied as the processed activity in the instance of the workflow. The second exemplary will be described in detail below.

Since the processing until the To-Do list is converted into the workflow is the same as that in the first exemplary embodiment, the description will not be repeated. According to the present exemplary embodiment, when the processing in step S10012 illustrated in FIG. 9 is completed, the document management control unit 1102 in the server software 1100 obtains the information about the instance of the workflow to which the task information is applied from the workflow control unit 1107.

Figure 14:
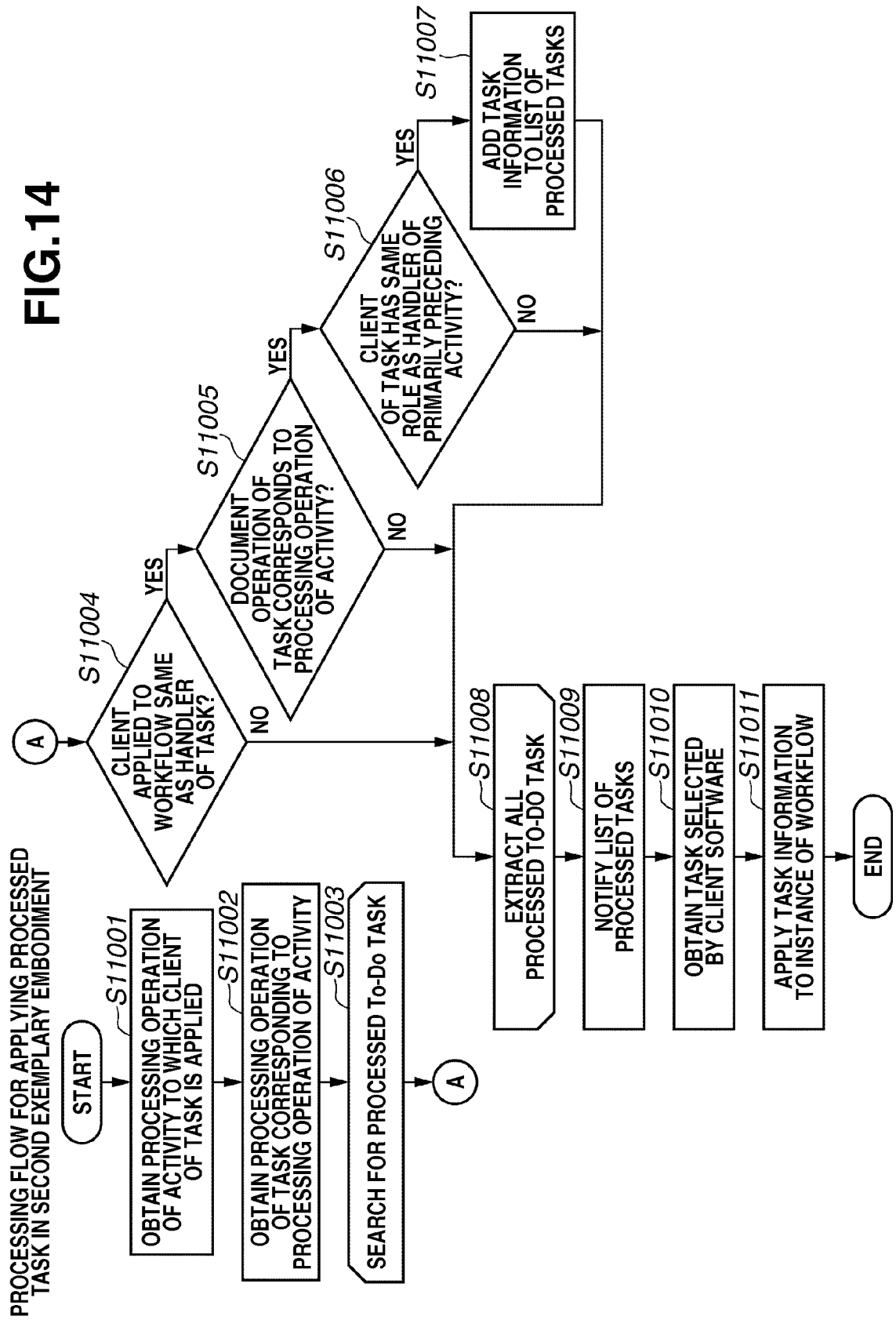
FIG. 14 is a flowchart illustrating processing for applying a processed task.

The document management control unit 1102 executes the processing for additionally applying the processed task, (processed-task applying processing) to the instance of the workflow. With reference to FIG. 14, processing for creating a list of the processed tasks will be described in detail.

FIG. 14 is a flowchart illustrating processing for applying the processed task. The processing of this flowchart is executed by the server software 1100. More specifically, the processing of this flowchart can be realized by the CPU of the server apparatus that loads a program stored in an external memory into the RAM and executes the program.

Firstly, in step S11001, from the instance of the workflow, the document management control unit 1102 obtains a processing operation 1312 of the activity to which the client of the conversion source task is applied. In the example of the instance of the workflow converted from the task having the task ID "2" described in the first exemplary embodiment (FIG. 13), the document management control unit 1102 obtains the processing operation "APPROVAL" of the activity "2" to which the client "SUZUKI" of the conversion source task is applied.

In step S11002, the document management control unit 1102 obtains the operation correspondence map from the operation correspondence map 1111 via the conversion control unit 1110 and the document operation 701 of the task corresponding to the processing operation of the activity obtained in step S11001. In the example illustrated in FIG. 13, the document management control unit 1102 obtains the document operation "DISPLAY" of the task corresponding to the processing operation "APPROVAL" of the activity "2".

In step S11003, the document management control unit 1102 obtains the processed tasks one by one from the To-Do list database 1105 via the database control unit 1103. The document management control unit 1102 performs control so that the processing in steps S11004, S11005, S11006, and S11007 (processed-task extracting processing) is performed on the task every time one task is obtained. In step S11003, when the task can be obtained, the processing proceeds to step S11004. When the task cannot be obtained, the processing proceeds to step S11008.

In step S11004, the document management control unit 1102 determines whether the client applied to the workflow (the processing operation 512 of the activity to which the client of the conversion source task is applied) is the same person as the handler 304 of the task obtained in step S11003. When it is determined that the client applied to the workflow is not the same person as the handler 304 of the task (NO in step S10004), the document management control unit 1102 returns the processing to step S11003 and controls the processing to perform on the next task.

When it is determined that the client applied to the workflow is the same person as the handler 304 of the task (YES in step S10004), the document management control unit 1102 controls the processing to proceed to step S11005. In the examples of the instance illustrated in FIG. 13 and the tasks illustrated in FIG. 3, only two tasks having the task IDs of "0" and "3" in which the handler 304 is the same person as the client "Suzuki" applied to the workflow, are extracted, and the processing proceeds to step S10005.

In step S11005, the document management control unit 1102 determines whether the document operation 302 demanded by the task (YES in step S11004) is the same operation as the document operation 701 of the task obtained in S11002. When it is determined that the document operation 302 of the task is not the same operation as the document operation 701 of the task (NO in step S11005), the document management control unit 1102 returns the processing to step S11003 and controls the processing to be performed on the next task.

When it is determined that the document operation 302 of the task is the same operation as the document operation 701 of the task (YES in step S11005), the document management control unit 1102 allows the processing to proceed to step S11006. In the examples of the instance illustrated in FIG. 13 and the tasks illustrated in FIG. 3, since both document operations 302 demanded by the tasks having the task IDs "0" and "3" are the document operation of "DISPLAY" of the task obtained in step S11002, both of them are extracted and the processing proceeds to step S10006.

In step S11006, the document management control unit 1102 obtains the role 402 of the client 303 of the task obtained in step S11003 from the role management database 1108 via the workflow control unit 1107. Further, the document management control unit 1102 determines whether the role 402 of the client of the obtained task is the same role as the handler of the primarily preceding activity to which the client 303 of the conversion source task is applied.

When it is determined that the role 402 of the client of the task is not the same role as the handler of the primarily preceding activity (NO in step S11006), the document management control unit 1102 returns the processing to step S11003 and controls the processing to be performed on the next task.

When it is determined that the role 402 of the client of the task is the same role as the handler of the primarily preceding activity (YES in step S11006), the document management control unit 1102 allows the processing to proceed to step S11007. In the examples of the instance illustrated in FIG. 13 and the tasks illustrated in FIG. 3, since both roles of the clients 303 of the task having the task IDs of "0" and "3" are "CLERK"s that are the same as that of the handler of the preliminary preceding activity "1", both tasks are extracted and the processing proceeds to step S11007.

In step S11007, the conversion control unit 11102 adds the task information obtained in step S11003, which includes the document operation 302, the client 303, the 304, the target document 305, and the task ID 301, to the list of the processed tasks.

When the processing in steps S11003, S11004, S11005, S11006, and S11007 is completed on all the processed tasks, in step S11008, the document management control unit 1102 finishes extraction of the list of the processed tasks and allows the processing to proceed to step S11009. As described above, in the examples of the instance illustrated in FIG. 13, information about the tasks illustrated in FIG. 3 and information about the tasks having the task IDs of "0" and "3" have been extracted as the list of the processed tasks, as of step S11008.

In step S11009, the document management control unit 1102 notifies the client software 1000 of the extracted list of the processed tasks via the communication control unit 1101 and waits for the reply from the client software 1000. When the list of the processed tasks does not exist, the document management control unit 1102 notifies the client software 1000 of no existence of the list via the communication control unit 1101.

In the client software 1000, the command control unit 1002 receives the list of the processed tasks via the communication control unit 1003. The command control unit 1002 that has received the list of the processed tasks shows the list of the processed tasks to the user as the list of the candidates of the processed activities via the user interface 1001 as indicated by reference numerals 1201 and 1202 in FIG. 15, and prompts the user to make a selection.

FIG. 15 illustrates a list, which is suggested to the user, of the candidates of the processed activities. The example indicated by the reference numerals 1201 and 1202 in FIG. 15 is displayed in a form of "client 303→handler 304→: document operation 302 demanded by target document 305", but may be displayed in other form.

When the user selects the information about the processed task to be applied as a past activity of the workflow from among the list of the candidates of the processed activities illustrated in FIG. 15, the user interface 1001 notifies the command control unit 1002 of the information about the selected task.

The command control unit 1002 that has received the information of the task selected by the user from the user interface 1001 notifies the server software 1100 of the information of the selected task via the communication control unit 1003.

In the server software 1100 in step S11010, the document management control unit 1102 obtains via the communication control unit 1101 the task information notified from the client software 1000. The document management control unit 1102 notifies the workflow control unit 1107 of the obtained task information, the WFID 1301 of the instance of the workflow, and the activity to which the task information is applied, and then gives an instruction to add the task information to the workflow.

The activity to which the task information is applied refers to the activity used as the condition for extracting the list of the processed task and also the activity to which the client of the task is applied as the handler in step S10012 in FIG. 9.

In step S11011, the workflow control unit 1107 that has received the instruction applies the client 303 of the specified task to the handler 1311 (FIG. 13) of the specified activity in the specified instance of the workflow. Subsequently, the workflow control unit 1107 updates the workflow management database 1109 with the instance of the workflow to which the client of the task is applied.

For example, when a reference numeral 1201 indicating the task having the task ID of "0" illustrated in FIG. 15 is selected as the processed task to be added as the past activity of the workflow, the client "TANAKA" of the task having the task ID of "0" is applied to the handler 1311 of the activity "1". FIG. 16 illustrates results of this application.

FIG. 16 illustrates one example of the instance of the workflow to which the processed task is applied as the past activity of the workflow. The example illustrated in FIG. 16 corresponds to the instance of the workflow converted from the task having the task ID of "2".

As described above, according to the present exemplary embodiment, the processed To-Do task can be also converted into the past activity of the workflow.

When only one processed task is extracted as the list of the processed tasks (not illustrated in FIG. 14), the document management control unit 1102 may allow the processing to directly proceed to step S11011 without notifying of the list of the processed tasks. In this case, in step S11011, the information about the only one extracted, processed task is applied to the instance of the workflow.

As described above, the present exemplary embodiment makes it easy for the user to replace the job flow managed by the task list with the workflow.

OTHER EMBODIMENTS

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-115788 filed May 12, 2009, which is hereby incorporated by reference herein in its entirety.

What is claimed is:

1. A document management system that includes a client apparatus and a server apparatus and individually manages a document operation job by a task, the client apparatus comprising:
a task list display unit configured to obtain a list of unprocessed tasks from the server apparatus and to display the list of the unprocessed tasks; and
an instruction unit configured to select one task from the list based on a user's instruction, and to give an instruction to convert the selected task stored by the server apparatus into a workflow, and the server apparatus comprising:
a task database configured to store tasks, each of the tasks including information about a target document of the task, a client of the task, a handler of the task and an operation of the task;
a workflow management database configured to store a plurality of workflow definitions, each workflow definition including a plurality of activities to be sequentially processed, wherein each activity includes information about a role of each handler and a processing operation therein;

a first obtaining unit configured to obtain information about the client of the selected task, the handler of the selected task and the operation of the selected task from the task database;

a second obtaining unit configured to obtain a role of the client of the selected task and a role of the handler of the selected task;

an extraction unit configured to extract workflow definitions including an activity corresponding to the selected task, from the workflow management database by comparing the roles of the client and the handler of the selected task obtained by the second obtaining unit with the roles of handlers of the activities included in the workflow definitions and by comparing the operation of the selected task obtained by the first obtaining unit with processing operations of the activities included in the workflow definitions;

a notification unit configured to notify the client apparatus of the workflow definitions extracted by the extraction unit, and to receive a workflow definition selected from among the notified workflow definitions by a user of the client apparatus;

a creation unit configured to create an instance of the workflow corresponding to the selected workflow definition received by the notification unit; and an application unit configured to apply information of the selected task to be converted by the instruction, to the activity corresponding to the selected task to be converted, in the instance of the workflow created by the creation unit.

2. A server apparatus used by a document management system that includes a client apparatus and the server apparatus, and individually manages a document operation job by a task, the server apparatus comprising:

a task database configured to store tasks, each of the tasks including information about a target document of the task, a client of the task, a handler of the task and an operation of the task;

a workflow management database configured to store a plurality of workflow definitions, each workflow definition including a plurality of activities to be sequentially processed, wherein each activity includes information about a role of each handler and a processing operation therein;

a first obtaining unit configured to obtain information about the client of the selected task, the handler of the selected task and the operation of the selected task from the task database;

a second obtaining unit configured to obtain a role of the client of the selected task and a role of the handler of the selected task;

an extraction unit configured to extract one or more workflow definition including an activity corresponding to the selected task from the workflow management database by comparing the roles of the client and the handler of the selected task obtained by the second obtaining unit with the roles of handlers of the activities included in the workflow definitions and by comparing the operation of the selected task obtained by the first obtaining unit with processing operations of the activities included in the workflow definitions;

a notification unit configured to notify the client apparatus of the workflow definitions extracted by the extraction unit, and to receive a workflow definition selected from the notified workflow definitions by a user of the client apparatus;

a creation unit configured to create an instance of the workflow corresponding to the selected workflow definition received by the notification unit; and an application unit configured to apply information of the selected task to be converted by the instruction, to the activity corresponding to the selected task to be converted, in the instance of the workflow created by the creation unit.

3. The server apparatus according to claim 2, further comprising:

a processed task extraction unit configured to extract processed tasks corresponding to the activity to which the task information is applied by the application unit, and a primarily preceding activity thereof, from the task database; and a processed task application unit configured to apply the information of the processed task extracted by the processed task extraction unit to the activity primarily preceding the instance of the workflow, to which the task information is applied by the application unit.

4. The server apparatus according to claim 3, wherein the processed task extraction unit notifies the client apparatus of the extracted processed task, and wherein the processed task application unit applies the information about the task selected by the client apparatus from among the tasks extracted by the processed task extraction unit, to the activity primarily preceding the instance of the workflow.

5. The server apparatus according to claim 2, further comprising:

a role management database configured to store a role of a user who can become the client and the handler of the task, and the handler of the activity, wherein said second obtaining unit obtains the roles of the client and the handler of the selected task from the role management database, and wherein the application unit applies the client of the selected task to the handler of the activity corresponding to the role of the handler of the selected task in the instance of the workflow, and further applies the handler of the above selected task to a handler of an activity next to the above activity.

6. The server apparatus according to claim 5, wherein the processed task extraction unit extracts the processed task that includes the handler corresponding to the handler of the activity to which the client of the task is applied by the application unit and further includes the client corresponding to the role of a handler of an activity primarily preceding the activity, wherein the processed task application unit applies the client of the processed task extracted by the processed task extraction unit to the handler of the activity primarily preceding the activity to which the task information is applied by the application unit in the instance of the workflow.

7. The server apparatus according to claim 5, further comprising an operation correspondence map configured to associate the document operation of the task with the processing operation of the activity, wherein the extraction unit extracts workflow definitions that includes the activity corresponding to the role of the client and an activity that is next to the activity, corresponding to the role of the handler and further corresponding to the processing operation in which the document operation of the task is associated by the operation correspondence map.

8. The server apparatus according to claim 7,
wherein the processed task extraction unit extracts a processed task that includes the handler to which the client of the task is applied by the application unit, the handler corresponding to respective operations, and the document operation, and further includes the client corresponding to the role of the handler of an activity primarily preceding the activity.

9. A method for controlling a server apparatus used for a document management system that includes a client apparatus and the server apparatus and individually manages a document operation job by a task, the method comprising:
- controlling a task database that stores tasks, each of the tasks including information about a target document of the task, a client of the task, a handler of the task and an operation of the task;
- controlling a workflow management database that stores a plurality of workflow definitions, each workflow definition including a plurality of activities to be sequentially processed, wherein each activity includes information about a role of each handler and a processing operation therein,
- obtaining information about the client of the selected task, the handler of the selected task and the operation of the selected task from the task database;
- obtaining a role of the client of the selected task and a role of the handler of the selected task;
- extracting one or more workflow definition including an activity corresponding to the selected task from the workflow management database by comparing the roles of the client and the handler of the obtained selected task with the roles of handlers of the activities included in the workflow definitions and by comparing the operation of the obtained selected task with processing operations of the activities included in the workflow definitions;
- notifying the client apparatus of the extracted workflow definitions;
- receiving a workflow definition selected from the notified workflow definitions by a user of the client apparatus;
- creating an instance of the workflow corresponding to the received selected workflow definition; and
- applying information about the selected task to be converted by the instruction, to an activity corresponding to the selected task to be converted, in the created instance of the workflow.

10. A non-transitory computer readable storage medium that stores a program for executing the method for controlling the server apparatus according to claim 9.

* * * * *